Patented Apr. 10, 1945

2,373,561

UNITED STATES PATENT OFFICE 2,373,561

PROCESS FOR POLYMERIZING OLEFINIC HYDROCARBONS

William Edward Hanford, Wilmington, Del., assignor to E. I. du Pont de Nemours & Company, Wilmington, Del., a corporation of Delaware No Drawing. Application July 4, 1942, Serial No. 449,779

10 Claims. (Cl. 260—67)

This invention relates to polymers of formaldehyde with aliphatic, polymerizable, monoolefin hydrocarbons, and more particularly to polymers of formaldehyde with ethylene.

The role of formaldehyde in the field of synthetic resins is well-known to the art, especially in the production of thermosetting plastics from phenol and urea. As a component of polymerization systems involving vinyl compounds its use is not so widespread but is nonetheless well-known. In some cases it has been employed as a "polymerization regulator," i. e., an agent which influences the degree of polymerization of the monomer being used. In other instances the formaldehyde participates in the polymerization reaction.

It is an object of this invention to provide new polymers of formaldehyde with aliphatic, polymerizable, monoolefin hydrocarbons. It is another object to provide new, solid, hydroxyl group-containing polymers from formaldehyde and readily available aliphatic, polymerizable, monoolefin hydrocarbons. It is still another object to provide solid, hydroxyl group-containing polymers from formaldehyde and ethylene. It is a final object to provide a simple and practical method for preparing such polymers.

Other objects and advantages of the invention will be apparent hereinafter.

The products of this invention are prepared by polymerizing an aliphatic, polymerizable, monoolefin hydrocarbon with a formaldehyde substance in the presence of a per-oxy compound catalyst.

The process by which the products of this invention are made may be operated over a wide range of temperatures, for example, from 25° C. to 200° C. It is not usually desirable to use the highest temperatures of this range since the molecular weights and yields of the product are adversely affected. On this account it is generally desirable to maintain the reaction temperature below about 150° C. As a rule, however, reaction at 25° C. tends to be slow, so that the preferred range extends from about 50° C. to about 150° C.

The molecular weight of these formaldehyde polymers is a function of the pressure used in their preparation, and in order to secure products with the most desirable molecular weights it is preferable to operate at the highest pressure convenient. Any pressure above atmospheric may be used, but it is generally preferred to operate in the range of from about 20 to about 1500 atmospheres.

By "aliphatic, polymerizable, monoolefin hydrocarbon" is meant any polymerizable aliphatic hydrocarbon containing as its sole unsaturation an olefin double bond. Examples of compounds of this type are ethylene, propylene, isobutylene, and the like.

By "per-oxy compound" is meant any compound which is capable of inducing vinyl polymerizations and which contains the bivalent radical —O—O—. Examples of such compounds are dibenzoyl peroxide, lauroyl peroxide, hydrogen peroxide, succinyl peroxide, acetyl benzoyl peroxide, dipropionyl peroxide, barium peroxide, diphthalic acid peroxide, diethyl peroxide, perbenzoic acid, potassium peroxydisulfate, ammonium peroxydisulfate, sodium and potassium percarbonates and the like.

By "formaldehyde substance" is meant formaldehyde itself and materials which yield formaldehyde by thermal decomposition or by catalytic decomposition. Examples of formaldehyde substances include formalin, paraformaldehyde, polyoxymethylene, trioxane (α-trioxymethylene), methylal and other formals, or hexamethylene tetramine. Sulfuric or phosphoric acids, zinc chloride, ferric chloride, sodium hydroxide and the like may be employed as decomposition catalysts. Formaldehyde is unique among all aldehydes and when employed in the operation of this invention yields polymers possessing a plurality of oxygen-containing units.

The examples which follow illustrate the practice of this invention and demonstrate operable conditions. Parts are given by weight unless otherwise specified.

Example 1

A silver-lined reaction vessel is charged with 100 parts by volume of 37% formalin and 0.5 part of benzoyl peroxide. The vessel is closed and evacuated and ethylene is admitted to a pressure of 750 atmospheres. The vessel is placed in a shaker machine and the necessary connections to thermocouples and pressure-recording devices are made. During a reaction time of 9 hours, throughout which the temperature is maintained at 73° to 75° C. and the pressure at 800 to 960 atmospheres, the total observed pressure drop is 880 atmospheres. The pressure is maintained in the designated range throughout the reaction by repressuring with ethylene. The vessel is cooled, bled of excess gas, opened, and the reaction mixture discharged. The polymer is isolated by steam distillation, filtration, and drying. There is thus obtained 14.3 parts of a white solid melting at 105–106° C., with an ethylene/formaldehyde ratio of 11.44 and an intrinsic viscosity of 0.24 (0.125% solution in xylene at 85° C.). This polymer contains hydroxyl groups, as evidenced by reaction with acetic anhydride, adipyl chloride, and hexamethylene diisocyanate, and by infra-red absorption spectra studies. It is soluble in benzene, dioxane, pyridine, and toluene; it is insoluble in acetic acid, alcohol and chloroform.

The ethylene/formaldehyde ratios are calculated from the carbon analysis of the polymers. Assuming a polymer unit of one HCHO and $X \cdot C_2H_4$ units, the equation which follows can be set-up:

$$\frac{C \text{ in } HCHO + C \text{ in } X \text{ moles } C_2H_4}{HCHO + xC_2H_4} = \frac{\% \text{ C in polymer}}{100}$$

Example II

A silver-lined reaction vessel is charged with 100 parts by volume of 37% formalin, 1 part of benzoyl peroxide, and 1 part of sodium bisulfite. The vessel is closed, evacuated, and pressured as described in Example I. During a reaction time of 10¼ hours, throughout which the temperature is maintained at 98° to 100° C. and the pressure at 690 to 935 atmospheres, the total observed pressure drop is 145 atmospheres. The pressure is maintained in the designated range during the reaction by the occasional admission of more ethylene. The vessel is cooled, bled of excess gas, opened, and the reaction mixture discharged. The product is isolated by steam distilling, filtering, and drying. It amounts to 16 parts of a white, fluffy solid which melts at 100° to 101° C. having an ethylene/formaldehyde ratio of 5.23 and an intrinsic viscosity of 0.30 (0.125% solution in xylene at 85° C.). It is soluble in benzene and toluene, but is insoluble in alcohol, acetic acid, chloroform, dioxane, and pyridine.

Example III

A silver-lined reaction vessel is charged with 100 parts by volume of 37% formalin, 1 part of benzoyl peroxide, and 1 part of sodium dithionite. The vessel is closed, evacuated, and pressured as described in Example I. During a reaction time of 11 hours, throughout which the temperature is maintained at 99° to 101° C. and the pressure at 900 to 930 atmospheres, the total observed pressure drop is 30 atmospheres. The product, isolated as has been described in previous examples, amounts to 5 parts of a fluffy white solid which melts at 105° to 106° C. It has an ethylene/formaldehyde ratio of 9.3 and an intrinsic viscosity of 0.23 (0.125% solution in xylene at 85° C.). It is soluble in benzene and toluene; it is insoluble in acetic acid, alcohol, chloroform, dioxane, and pyridine.

Example IV

A silver-lined reaction vessel is charged with 100 parts by volume of 60% formalin (prepared from paraformaldehyde), 0.5 part of benzoyl peroxide, and 1 part of sodium bisulfite. The vessel is closed, evacuated, and pressured with ethylene as described in Example I. During a reaction time of 10¾ hours, throughout which the pressure is maintained at 660 to 950 atmospheres and the temperature at 99° to 103° C., the total observed drop in pressure is 55 atmospheres. The product, isolated by steam distilling the reaction mixture, washing, and drying, amounts to 12 parts of a soft, waxy solid which melts at 88° to 89° C. It has an ethylene/formaldehyde ratio of 5.63. The polymer is soluble in benzene, chloroform, dioxane, pyridine, and toluene and insoluble in ethanol and acetic acid. It contains hydroxyl groups.

Example V

A silver-lined reaction vessel is charged with 100 parts by volume of dioxane, 50 parts of paraformaldehyde, 0.5 part of benzoyl peroxide, and 1 part of sodium bisulfite. The vessel is closed, evacuated, and pressured with ethylene as described in Example I. During a reaction time of 8¾ hours, throughout which the temperature is maintained at 194° to 205° C. and the pressure at 605 to 610 atmospheres, the total observed pressure drop is 10 atmospheres. The product is isolated by steam distilling the reaction mixture and evaporating the non-volatile residue to dryness. There is thus obtained 13 parts of a brown, viscous material which has an ethylene/formaldehyde ratio of 0.23 and a molecular weight of 348. It is soluble in dioxane, pyridine, and ethanol; it is slightly soluble in acetone, methanol, water, benzene, and toluene; and is insoluble in acetic acid, chloroform, and ether.

Example VI

A silver-lined reaction vessel is charged with 100 parts by volume of 35% formalin, 10 parts of aluminum sulfate, and 0.5 part of benzoyl peroxide. The vessel is closed, evacuated, and pressured with ethylene as described in Example I. During a reaction time of 8¾ hours, throughout which the temperature is maintained at 88° to 92° C. and the pressure at 875 to 965 atmospheres, the total observed pressure drop is 285 atmospheres. The product is isolated by steam distilling, washing, and drying. There is thus obtained 33 parts of a white polymer which melts at 104° to 109° C. It has an ethylene/formaldehyde ratio of 14.3.

Example VII

A silver-lined reaction vessel is flushed with nitrogen and charged with 50 parts of water, 50 parts of trioxane, 0.5 part by volume of diethyl peroxide, and 2 drops of concentrated sulfuric acid. The vessel is closed, evacuated, and pressured with ethylene as described in Example I. During a reaction time of 9¾ hours, throughout which the temperature is maintained at 148° to 164° C. and the pressure at 920 to 980 atmospheres, the total observed pressure drop is 60 atmospheres. The product is isolated by steam distilling the reaction mixture, washing the product thoroughly with water, and drying. There is thus obtained 45.1 parts of a white solid which melts at 99° to 100° C. It has an ethylene/formaldehyde ratio of 27. It is insoluble in all common organic solvents.

Example VIII

A silver-lined reaction vessel is flushed with nitrogen and charged with 50 parts by volume of dry benzene, 50 parts of trioxane, 0.5 part of benzoyl peroxide, and 1 drop of concentrated sulfuric acid. The vessel is closed, evacuated to ca. 100 mm. pressure, and pressured with ethylene as described in Example I. During a reaction time of 9¼ hours, throughout which the temperature is maintained at 72° to 77° C. and the pressure at 865 to 1000 atmospheres, the total observed pressure drop is 245 atmospheres. The product, isolated by steam distilling, washing, and drying, amounts to 12.2 parts of a white solid which melts at 116° to 117° C. It has an ethylene/formaldehyde ratio of 7.3 and an intrinsic viscosity of 0.375 (0.125% solution in xylene at 85° C.). It is soluble in pyridine, acetic acid, and toluene, and is insoluble in chloroform, dioxane, n-butanol, and phenol.

Example IX

A silver-lined reaction vessel is flushed with nitrogen and charged with 50 parts of trioxane, 0.5 part of benzoyl peroxide, and 1 part by volume of a 10% solution of zinc chloride in glacial acetic acid. The vessel is closed, evacuated, and pressured with ethylene as described in Example I. During a reaction time of 9¼ hours, throughout which the temperature is maintained at 73° to 75° C. and the pressure at 900 to 925 atmospheres, the total observed pressure drop is 25 atmospheres. The product is isolated by steam distilling the reaction mixture, washing with water, and drying. There is thus obtained 17 parts of a white polymer which melts at 113° to 114° C. It has an ethylene/formaldehyde ratio of 4.63 and an intrinsic viscosity of 0.76 (0.125% solution in xylene at 85° C.). It is soluble in pyridine and toluene and insoluble in acetic acid, chloroform, dioxane, butanol, and phenol.

Example X

A silver-lined reaction vessel is flushed with nitrogen charged with 50 parts of trioxane, 0.5 part of benzoyl peroxide, and 5 drops of 85% phosphoric acid, and closed, evacuated, and pressured with ethylene as described in Example I. During a reaction time of 9¼ hours, throughout which the temperature is maintained at 75° to 80° C., and the pressure at 850 to 1050 atmospheres, the total observed pressure drop is 535 atmospheres. The product, isolated by steam distilling, washing and drying, amounts to 39.3 parts of a white polymer which melts at 107° to 108° C. It has an ethylene/formaldehyde ratio of 23.4 and an intrinsic viscosity of 0.70 (0.125% solution in xylene at 85° C.). It is soluble in pyridine and toluene, insoluble in acetic acid, butanol, chloroform, dioxane, and phenol.

The concentration of peroxide catalyst may vary over a wide range. For reasons of economy and in order to obtain products of the best molecular weight, it is generally desirable to use low concentrations of catalyst, for example, from about 0.01% to about 1%. Lower molecular weight products, which may be desirable for many uses, are conveniently prepared with catalyst concentrations up to 15% or more based on the amount of polymerizable monomers. If desired the catalyst can be added to the reaction mixture as an aqueous emulsion.

A solvent or reaction medium is not an essential to operativeness although one may be used if desired. Any non-polymerizable normally liquid compound is a satisfactory solvent for the reaction. The preferred examples are water, dioxane, benzene, toluene, isooctane, cyclohexane, methanol, ethanol, sec.-butanol, tert.-butanol, methyl formate, methyl acetate, ethyl acetate, and the like.

The pH of the reaction mixture is not critical, although it is generally preferable to operate the reaction in a pH range of 3 to 11. If desired, salts such as sodium bisulfite, or sodium dithionite may be added to the reaction mixture to accelerate the reaction and improve the yields of desired products. In general, it has been found that the employment of basic reagents tends to produce soluble and fusible products, while acidic materials yield insoluble and infusible products.

Although the purity of the reactants is not critical to operativeness, it is preferable to use reagents as pure as is commercially feasible. Formaldehyde preparations of ordinary commercial grade are usually satisfactory. The unsaturated hydrocarbons may be purified batchwise or continuously and the purified materials stored until needed.

Molecular oxygen is one of the most objectionable impurities and for most efficient operation its substantial exclusion is necessary. In general the process is operated under conditions such that the total molecular oxygen content of the system is less than 1000 parts per million and preferably less than 20 parts per million.

The reaction vessels used in the operation of this invention should be capable of withstanding the pressures ordinarily used in conducting the reactions or developed during the reaction. In addition, it has been found that these vessels should be manufactured of or lined with corrosion-resistant materials. The preferred examples of these are silver, sterling silver, stainless steel, aluminum, glass, porcelain, and enamel.

The products obtained in the practice of this invention are solid, oxygen-containing polymers useful per se and as intermediates leading to other synthetic resins. The lower molecular weight polymers, for example, are waxlike in nature and hence are useful as synthetic waxes, in the preparation of cast or molded objects, films, and fibers.

Since these polymers contain hydroxyl groups they may be sulfonated to produce polymeric detergents, esterified, converted to xanthates or acetals, or treated with bifunctional reagents to produce crosslinked products.

Various changes may be made in the details and specific embodiments of this invention without departing from its scope and spirit. It is to be understood therefore that it is not limited, except as defined by the claims which follow.

I claim:

1. The normally solid, hydroxyl group-containing polymers obtained by reacting a formaldehyde substance with a monoolefin selected from the group consisting of ethylene, propylene and the isobutylenes in the presence of a per-oxy compound catalyst.

2. The normally solid, hydroxyl group-containing polymer obtained by reacting formaldehyde with ethylene in the presence of a per-oxy compound catalyst.

3. A process for the preparation of polymerization products which comprises heating together a formaldehyde substance and a monoolefin selected from the group consisting of ethylene, propylene and the isobutylenes in the presence of a per-oxy compound catalyst, at a temperature of 25° to 200° C., and at a pressure of about 20 to about 1500 atmospheres.

4. A process for the preparation of polymerization products which comprises heating together formaldehyde and a monoolefin selected from the group consisting of ethylene, propylene and the isobutylenes in the presence of an organic peroxide catalyst, at a temperature of 25° to 200° C., and at a pressure of about 20 to about 1500 atmospheres, at a pH in the range of 3 to 11.

5. A process for the preparation of polymerization products which comprises heating together formaldehyde, and a monoolefin selected from the group consisting of ethylene, propylene and the isobutylenes in the presence of benzoyl peroxide, at a temperature of 25° to 200° C., and at a pressure of about 20 to about 1500 atmospheres, at a pH in the range of 3 to 11.

6. A process for the preparation of polymerization products which comprises heating together formaldehyde and ethylene, in the presence of a per-oxy compound catalyst.

7. The normally solid, hydroxyl group-containing polymer obtained by reacting a formaldehyde substance with a monoolefin selected from the group consisting of ethylene, propylene and the isobutylenes in the presence of a per-oxy compound catalyst at a temperature of 25° to 200° C. and at a pressure of about 20 to about 1500 atmospheres, at a pH of 3 to 11.

8. The normally solid, hydroxyl group-containing polymer obtained by reacting a formaldehyde substance with ethylene in the presence of a per-oxy compound catalyst, at a temperature of 25° to 200° C., and at a pressure of about 20 to about 1500 atmospheres, and at a pH of 3 to 11.

9. The normally solid, hydroxyl group-containing polymer obtained by reacting a formaldehyde substance with ethylene at a temperature of 25° to 200° C., at a pressure of about 20 to about 1500 atmospheres, at a pH in the range of 3 to 11, and in the presence of benzoyl peroxide.

10. The normally solid, hydroxyl group-containing polymer obtained by reacting formaldehyde with ethylene, at a pH in the range of 3 to 11 in the presence of a peroxide catalyst, at a temperature of 50 to 150° C., and at a pressure of about 20 to about 1500 atmospheres.

WILLIAM EDWARD HANFORD.